Oct. 9, 1951 F. W. HOTTENROTH 2,570,451
LIQUID LEVEL CONTROL SYSTEM
Filed Aug. 17, 1948 2 Sheets-Sheet 1

INVENTOR.
Frederick W. Hottenroth,
BY Bair & Freeman
Att'ys.

Oct. 9, 1951 — F. W. HOTTENROTH — 2,570,451
LIQUID LEVEL CONTROL SYSTEM
Filed Aug. 17, 1948 — 2 Sheets-Sheet 2
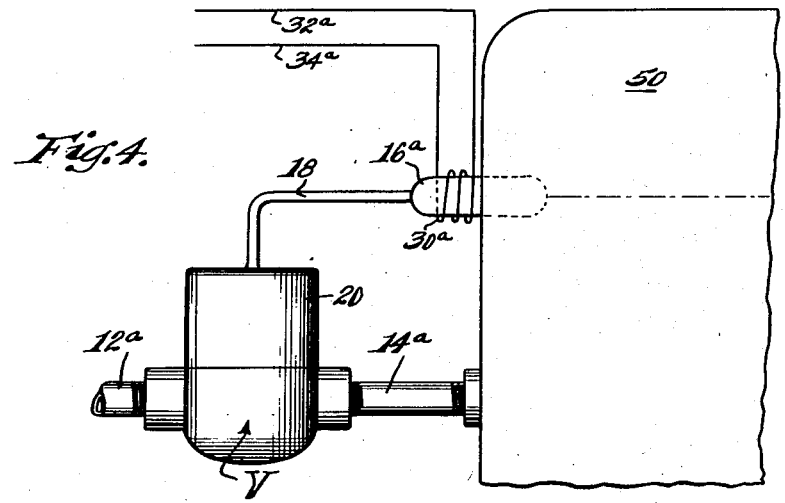
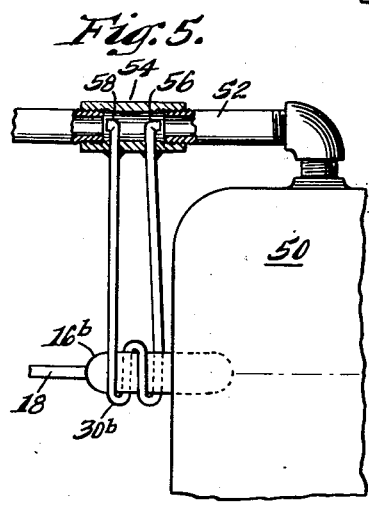
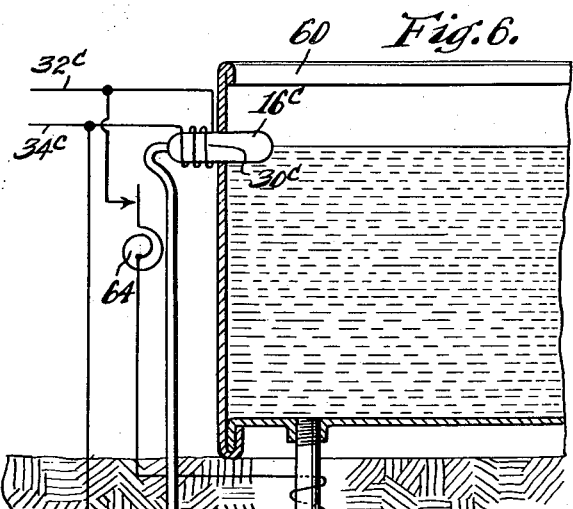
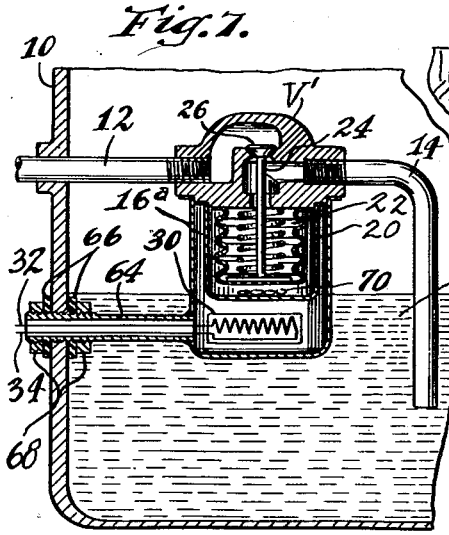
INVENTOR.
Frederick W. Hottenroth.
BY Bair & Freeman
Att'ys.

Patented Oct. 9, 1951

2,570,451

UNITED STATES PATENT OFFICE 2,570,451

LIQUID LEVEL CONTROL SYSTEM

Frederick W. Hottenroth, Goshen, Ind., assignor to Penn Electric Switch Co., Goshen, Ind., a corporation of Iowa Application August 17, 1948, Serial No. 44,749

3 Claims. (Cl. 236—44)

This invention relates to a liquid level control system wherein a liquid control valve is operable in such manner that it responds to the level of liquid in a container without requiring a float for its operation.

One object of the invention is to provide means for controlling the supply of liquid to a container by means of a temperature responsive bulb in the container at the desired liquid level, the bulb being heated and a valve for the liquid supply having a power element connected with the bulb so that the valve is opened by the heated bulb and closed by liquid contacting the bulb and thereby cooling it.

Another object is to provide means for controlling the supply of water to a humidifier pan with a single valve instead of the usual manner using a solenoid valve and a float valve in series.

Still another object is to provide a control valve for humidifiers which is more reliable in operation than the combination float and solenoid valve arrangement heretofore used.

Still another object is to provide a valve which is temperature responsive, the temperature responsive element responding to two heat sources:

(1) A heat source controlled by a humidostat, and (2) A heat source which is the temperature of the humidifier pan modified by the level of water therein.

A further object is to provide a water control valve for the water line to a humidifier, which control valve is temperature responsive by having a power element connected with a temperature sensing bulb, the bulb being located at least partially in a humidifier pan so as to be responsive to the temperature thereof, that is heated by the pan, and cooled by water in the pan whenever the water reaches a level where it contacts with the bulb, an electric coil element being wrapped around another portion of the bulb and capable of energization by a humidostat or comparable control device.

Still a further object is to provide a temperature responsive valve which is actuated to the open position by a humidostat responding to a predetermined decrease in moisture in the atmosphere, whereupon, the humidostat effects heating of the bulb, and the bulb being subsequently cooled to a temperature for closing the valve when the level of water in the humidifier pan reaches the bulb even though the humidostat is still calling for additional moisture.

An additional object is to provide a means to supply water to a boiler, stock watering tank or the like which does not have any movable element such as a float projecting into the boiler or tank.

Another additional object is to provide a modified arrangement of the foregoing described control device wherein a chamber of the valve contains the equivalent of the water level responsive bulb and its heater whereby the entire control is in the form of a single unit.

With these and other objects in view, my invention consists in the construction, arrangement and combination of the various parts of my control system whereby the objects contemplated are attained, as hereinafter more fully set forth, pointed out in my claims and illustrated in the accompanying drawings, wherein:

Figure 4 illustrates a modification of the invention wherein the level of water in a boiler or other container is controlled.

Figure 5 is a portion of Figure 4 with a steam heated means to heat the bulb in place of an electrically heated bulb.

Figure 6 shows my invention applied to a stock watering tank or the like for controlling the level of water therein, and Figure 7 shows a modification of Figure 1.

Figure 1:
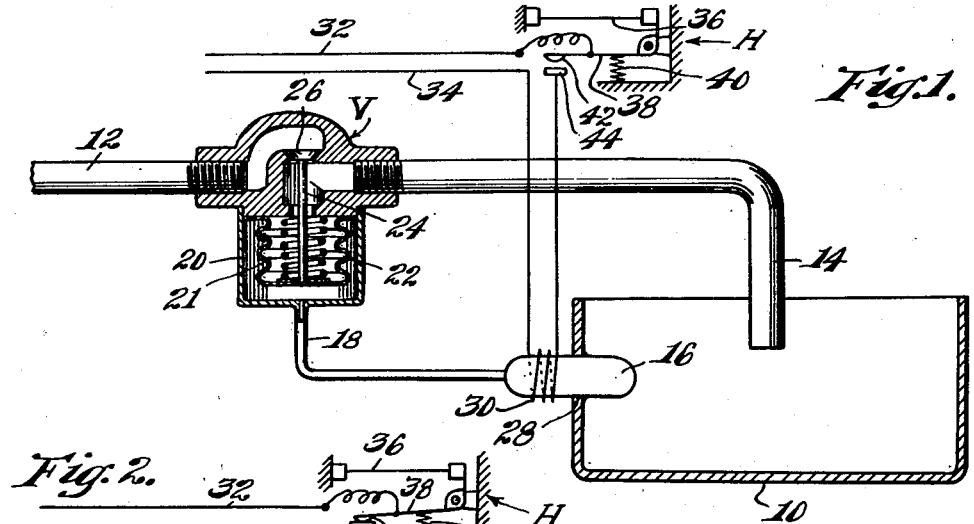
Figure 1 is a diagrammatic view showing my humidifier control system in the position that the parts assume when the air is sufficiently moist that no humidification is required.

On the accompanying drawing I have used the reference numeral 10 to indicate a humidifier pan. These pans are usually formed of cast iron or the like, are relatively shallow and are positioned on top of the plenum chamber of a furnace or in position with respect to a heating plant where the heat will vaporize the water in the pan. The pan 10 is shown dry in Figure 1.

A water supply pipe 12 is provided for supplying water through an outlet pipe 14 to the pan 10. A valve V is provided to control the flow of water. The valve V is normally closed as shown in Figure 1, and is adapted to be opened by predetermined temperature affecting a temperature sensing bulb 16.

The bulb 16 is connected by a capillary tube 18 with a pressure chamber 20 surrounding a bellows 22 on the valve V. The bellows is connected by a stem 24 with a valve plug 26 of the valve. The pressure system 16—18—20 is filled with a "limited" fill—that is a few drops of vaporizable fluid such as alcohol, ether or other suitable liquid is deposited therein so that at the desired temperature it will vaporize and build up pressure within a rather narrow range and such build-up of pressure will open the valve.

The bulb 16 is installed through an opening 28 of the humidifier pan 10, the joint between the two being suitably sealed against leakage. Preferably the bulb has a portion inside the pan and a portion outside. The portion outside is wound with a heating element 30, which is supplied with current from wires 32 and 34 under the control of a humidostat H.

The humidity responsive element of the humidostat is shown at 36. When it contracts, due to a predetermined decrease in humidity, it moves a contact arm 38 downwardly against the action of a spring 40 for closing a contact 42 on the arm against a stationary contact 44. Thereupon the heating element 30 is energized.

When the humidity increases, the element 36 expands for permitting the spring 40 to separate the contacts in relation to each other, thus deenergizing the heating element 30.

In Figure 4 I show my control valve and bulb combination in connection with a boiler 50. A bulb 16a projects partially into the boiler and may be continuously heated by a heating element 30a supplied with current from supply wires 32a and 34a. The valve is shown at V and is substantially the same valve disclosed in Figures 1, 2 and 3. Its power element within the housing 20 is connected by a capillary tube 18 to the bulb 16a. A water supply pipe 12a leads to the valve and a discharge pipe 14a leads therefrom into the boiler.

Instead of the heating element 30a a steam coil 30b may be provided for heating the bulb. The coil receives steam from a steam pipe 52 leading from the boiler to the radiators. For instance, a special fitting 54 may be provided in which the ends of the steam coil 30b terminate at 56 and 58. This arrangement will cause a flow of steam in the coil 30b for continuously heating the bulb 16a.

In Figure 6 I show how the valve V may be used as a liquid level control valve in connection with a stock watering tank 60. The bulb 16c is placed at the desired water level and connected by the tube 18 to the power element 20 of the valve. Various other elements in this figure bear the same reference numerals as in previous figures with the addition of the distinguishing character c. The means for heating the bulb 16c is shown as a heating element 30c continuously supplied with electric current.

The valve V may be located below the frost line to prevent it from freezing and the pipe 14c extending upwardly from it may be heated as by a heating element 62 to prevent the water therein from freezing. The heating element 62 may be thermostatically controlled by means of a thermostat 64 so that the heating element 62 need not be energized except when necessary.

In Figure 7 I show the equivalent of Figure 1 wherein instead of the bulb 16 a chamber 16a is built directly on to the body of the valve so as to form an integral part thereof. The modified form of valve shown in Figure 7 is designated V'. The heater 30 is contained in the chamber 16a for vaporizing the limited fill consisting of a few drops of a properly selected liquid indicated at 70 within the pressure chamber 20 around the bellows 22. The valve V' is located within the humidifier pan 10 so that the water 48 can contact it at the upper level limit and thus act on the chamber 16a the same as it does on the bulb 16 in Figure 1.

Any suitable arrangement for the current supply wires 32 and 34 to the heater 30 may be provided such as a conduit 64 on which is mounted packing washers 60 and lock nuts 68.

*Practical operation*

Figure 2:
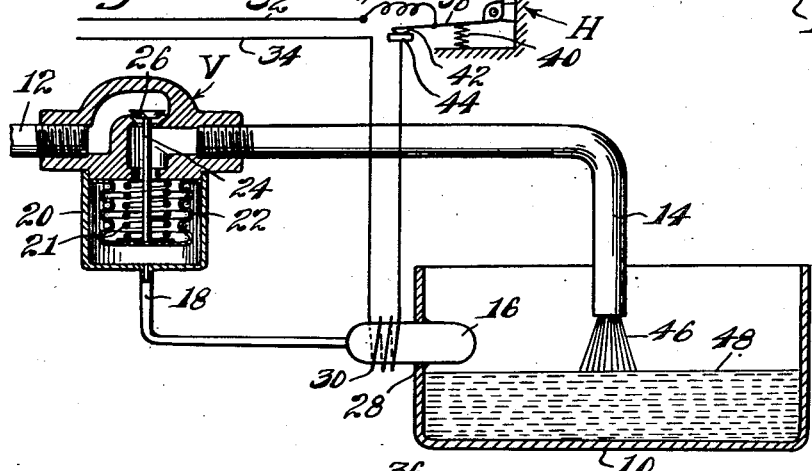
Figure 2 is a similar diagrammatic view showing the humidostat calling for moisture and therefore closed to effect opening of the water valve for supplying water to the humidifying pan.

In the operation of my humidifier control system, starting with the parts in the position in Figure 1, when the atmosphere surrounding the element 36 loses moisture to a predetermined extent, the contacts 42 and 44 are closed for energizing the heating element 30, which raises the temperature of the bulb 16, thereby vaporizing the liquid fill therein. On the other hand, the fill may be one which does not vaporize at the temperature of the heating element. In either case, pressure will be produced in the chamber 20 for opening the valve V, as illustrated in Figure 2. As a result, water 46 flows from the pipe 14 and is deposited at 48 in the humidifier pan 10 so that the heat of the heating plant will vaporize the water to increase the humidity in the room.

When the water reaches the level of the bulb 16, it starts to cool it and by the time it is about half-way up the bulb has cooled it to such an extent as to offset the heat from the heater 30. This permits the spring 21 in the valve to close the valve, as in Figure 3, even though the humidostat H is still calling for moisture.

Figure 3:
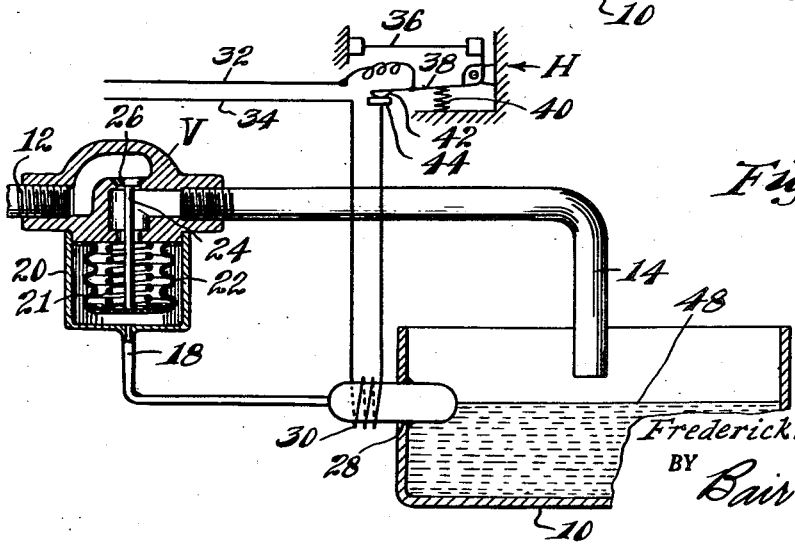
Figure 3 is a similar diagrammatic view showing the valve closed as a result of rise in the water level to a predetermined point.

As long as the humidostat is calling for moisture, the water level will be maintained approximately as in Figure 3 because lowering of the water will permit the heat of the element 30 to predominate the cooling effect of the water, thereby opening the valve again until the bulb is cooled sufficiently by the rising water to close the valve.

A state of equilibrium will be reached and approximately maintained until such time as the humidostat is satisfied, whereupon it will open and the bulb 16 will cool additionally because of the dissipation of heat from the heating element. The water level will gradually recede due to vaporization, unless the humidostat again closes before the water has all evaporated. Automatic means is thus had for opening the valve when humidity is required, and closing it in a manner comparable with a float valve when the water level rises to a predetermined point.

My humidity control system utilizes but a single valve with both the water level and the humidostat serving as control factors in conjunction with each other on a single valve. Heretofore two valves have been used; one a float valve mechanically actuated, and the other a solenoid valve electrically operated by the humidostat. With my arrangement, one of these two valves is eliminated, and also the possibility of mechanical failure of the float, float arm and connection of the float arm to the valve element of the float valve.

Also, two valve seats and valve plugs have to be kept in proper service, whereas with my arrangement, a single valve serves the purpose without any mechanical connection between a water level sensing element and the valve itself. Instead, a single temperature operated valve is controlled by two factors, the water level and humidity. The control system is thus less complicated and less expensive to manufacture as well as being more convenient and less expensive to install. The possibility of mechanical failure experienced with floats and float levers or arms is entirely eliminated.

In the operation of the system shown in Figures 4 and 5, whenever the level of water in the boiler 50 lowers below the bulb 16a the heat of the element 30a or the steam coil 30b will heat the bulb 16a sufficiently to cause the valve V to open thereby admitting additional water. When the water level rises to the bulb, the water will absorb enough heat from the bulb that the heater 30a or 30b can no longer keep the valve V open and the valve will close. Obviously this arrangement can be used to control the level of any liquid in any container and is not limited to humidifier pans or boilers.

The operation of the system shown in Figure 6 is similar to that described in connection with Figure 4. In freezing weather the bulb 16c is a decided advantage over a float which mechanically opens a valve when the water level lowers. The surface of the water can freeze around a float and render it inoperative. On the other hand, the bulb 16c being heated will keep the water free of ice in the immediate vicinity of the bulb so that the operation of the valve V is unhampered.

My arrangement permits the valve V to be remotely located with respect to the bulb 16c so that the valve can be located underground below the frost line to prevent it from freezing up. A small amount of heat then applied to the riser pipe 14c is sufficient to prevent the water in this pipe from freezing.

The modified form of invention disclosed in Figure 7 operates substantially as described in connection with Figures 1, 2 and 3. The advantage of this arrangement is that the equivalent 16a of the bulb 16 is an integral part of the valve V' instead of two separate units having to be installed and connected together by the capillary tubing 18.

Some changes may be made in the construction and arrangement of the parts of my control system without departing from the real spirit and purpose of my invention, and it is my intention to cover by my claims any other modified forms of structure or use of mechanical equivalents which may be reasonably included within their scope without sacrificing any of the advantages thereof.

I claim as my invention:

1. In a system of the character disclosed, a container for liquid, a temperature sensing bulb partially inside and partially outside said container, a normally closed valve for supplying water to said container and adapted to be opened by said temperature sensing bulb upon predetermined increase in temperature thereof, the portion of said bulb in said container being contacted with liquid therein when it rises to a predetermined level and thereby cooled sufficiently to counteract the temperature acting on said temperature sensing bulb, and humidostatically controlled means for heating the portion of said bulb outside said container.

2. In a humidifier control system for a furnace, a water valve, pressure responsive means for actuating said water valve, a heating element, a temperature sensing bulb responsive both to water level and to said heating element and operable upon temperature rise to cause said pressure responsive means to open said water valve, a humidostat for controlling said heating element, said heating element when energized being capable of effecting opening of said valve as long as said temperature sensing element is located in the furnace atmosphere and said bulb is dry, and the contact of water with said bulb being effective to counteract the heat of said heating element for thereby causing said pressure responsive means to close said valve.

3. In a humidifier system for a heating device, a humidifier pan, a temperature sensing bulb partially within and partially without said pan, a normally closed valve adapted to be opened by said temperature sensing bulb upon pre-determined increase in temperature thereof, said valve when open supplying water to said pan the portion of said bulb in said pan being contacted with water in the pan when it rises to a pre-determined level, an electric heating element for the portion of said bulb outside said pan, a humidostat, a circuit for energizing said heating element, said humidostat being connected in said circuit to close it upon pre-determined increase in the humidity affecting said humidostat thereby to cool said bulb to a point where said valve closes, even though said heating element is energized when the water level reaches said bulb.

FREDERICK W. HOTTENROTH.

REFERENCES CITED

The following references are of record in the file of this patent:

UNITED STATES PATENTS

| Number | Name | Date |
|---|---|---|
| 1,294,074 | Faber | Feb. 11, 1919 |
| 1,837,213 | Galloway | Dec. 22, 1931 |
| 1,988,877 | Shivers | Jan. 22, 1935 |
| 2,018,097 | Smith | Oct. 22, 1935 |
| 2,083,780 | Gille | June 15, 1937 |
| 2,324,647 | Ray | July 20, 1943 |
| 2,394,885 | Baak | Feb. 12, 1946 |